United States Patent [19]

Häussermann

[11] Patent Number: 4,886,252

[45] Date of Patent: Dec. 12, 1989

[54] HYDRAULICALLY DAMPING SPRING DEVICE

[75] Inventor: Gerd Häussermann, Stuttgart, Fed. Rep. of Germany

[73] Assignee: Daimler-Benz Aktiengesellschaft, Stuttgart, Fed. Rep. of Germany

[21] Appl. No.: 305,194

[22] Filed: Feb. 2, 1989

[30] Foreign Application Priority Data

Feb. 24, 1988 [DE] Fed. Rep. of Germany ....... 3805761

[51] Int. Cl.$^4$ .......................... B60K 5/12; F16F 9/00; F16F 13/00
[52] U.S. Cl. .................................. 267/140.1; 267/122; 267/219
[58] Field of Search ...................... 267/219, 220, 64.28, 267/140.1–141.7, 122, 35, 64.11, 64.14, 64.15–64.27; 188/298, 299, 320, 300; 248/550, 562, 561, 563–566, 573–578, 636, 638, 659, 559; 280/708–712, DIG. 1, 706, 714; 180/300, 312, 902; 123/192 R

[56] References Cited

U.S. PATENT DOCUMENTS

| | | | |
|---|---|---|---|
| 4,516,545 | 5/1985 | Kumagai et al. | 188/298 X |
| 4,699,099 | 10/1987 | Arai et al. | 180/312 X |
| 4,700,933 | 10/1987 | Chikamori et al. | 180/300 X |
| 4,709,779 | 12/1987 | Takehara | 180/300 |
| 4,720,084 | 1/1988 | Hollerweger et al. | 248/562 X |
| 4,754,956 | 7/1988 | Barone et al. | 267/219 X |
| 4,759,534 | 7/1988 | Härtel | 267/140.1 |
| 4,768,759 | 9/1988 | Bellamy et al. | 267/140.1 |
| 4,793,599 | 12/1988 | Ishioka | 248/550 X |

FOREIGN PATENT DOCUMENTS

| | | | |
|---|---|---|---|
| 0278824 | 8/1988 | European Pat. Off. | 267/219 |
| 2905090 | 8/1980 | Fed. Rep. of Germany . | |
| 3404593 | 8/1984 | Fed. Rep. of Germany . | |
| 3614161 | 11/1987 | Fed. Rep. of Germany . | |
| 3731024 | 3/1988 | Fed. Rep. of Germany | 267/219 |
| 2540587 | 8/1984 | France . | |
| 0104422 | 6/1985 | Japan | 248/562 |
| 0055426 | 3/1986 | Japan | 267/219 |
| 0197835 | 9/1986 | Japan | 267/140.1 |
| 0030623 | 2/1988 | Japan | 248/562 |
| 0072934 | 4/1988 | Japan | 267/140.1 |
| 2191561 | 12/1987 | United Kingdom | 180/300 |

Primary Examiner—Douglas C. Butler

[57] ABSTRACT

A hydraulically damping rubber bearing, usable as an engine mount in a motor vehicle has two end walls, between which are arranged two working chambers, both of which are filled with damping fluid and which are separated by a dividing wall in which is arranged a channel inter-connecting the working chambers with one another. The length of the channel is at least equal to the diameter of the dividing wall and its cross-section is small relative to its length. In order to make possible efficient damping of vibrations of various frequencies and amplitudes acting on the rubber bearing, the damping characteristics of the rubber bearing can be matched to the vibrations to be damped by either changing the size of the wall area or volume of the channel by intervention control from outside the bearing.

4 Claims, 2 Drawing Sheets

HYDRAULICALLY DAMPING SPRING DEVICE

BACKGROUND AND SUMMARY OF THE INVENTION

The invention relates to a hydraulically damping rubber spring device usable as an engine mount for motor vehicles having two end walls lying opposite one another along the axial direction of the spring device and between which are arranged two working chambers. Both working chambers are filled with damping fluid and are separated from each other by a dividing wall in which is arranged a channel connecting the working chambers to one another. The length of said channel is at least equal to the diameter of the dividing wall and the cross-section of the channel is small relative to its length. A rubber-elastic spring element adjoins one of the working chambers and is secured on an end wall. The size of the wall area and the volume of the channel are changeable by complete, or partial, isolation of one longitudinal portion of the channel by intervention from outside.

A rubber spring device of this general type is disclosed in German Patent No. 2,905,090. This rubber spring device, has a multi-turn channel as a connection for the two working chambers with vibrations of low frequency. Vibrations of a high amplitude are subjected to powerful damping by the fluid column, vibrating in the channel, acting as a damper by reason of its internal fiction and its friction against the channel wall. It has now been found that the bandwidth of the frequencies of the vibrations, the damping of which is found to be necessary in many applications, is so great (namely between about 6 and over 20 Hz), that the liquid column in the channel is no longer capable of following the vibrations of the bearing at least in individual frequency ranges and thus, as a result of its low degree of movement, can only generate a low damping force.

The object on which the invention is based is, was to develop a rubber spring device of this general type, so as to achieve better matching of the damping characteristics of the rubber spring device and, in particular, with respect to the frequency and damping force of the actual vibrations acting on the rubber spring device which need to be damped.

This is achieved by having a rotary slide arranged in the channel and transverse to it and with a first longitudinal portion of the channel being open towards one working chamber in one rotary end position of the slide and connected to another longitudinal portion of the channel which opens towards the other working chamber, in the other rotary end position of the valve. Between these rotary end positions, the slide is connected to both longitudinal portions with a continuously changeable passage cross-section.

In the rubber spring device designed according to the invention, with its alterable channel volume, the fluid volumes in the channel can be selected continuously in such a way that the natural frequency of the fluid column in the channel bears a particular relationship to the vibration frequencies imposed from outside. As a result of this, the vibration behavior of the fluid column and the damping force associated therewith can be selected to damper in the desired manner. In particular, in the case of matching the natural frequency of the fluid in the channel to the frequency of the imposed vibration, a high velocity of the fluid in the channel and hence a high damping force is achievable. In addition, in the rubber spring device designed according to the invention, the damping force can be matched to the requirements by reason of the fact that as the fluid volume alters, the internal friction of the fluid alters and as the size of the channel wall area alters, the friction between the latter and the fluid alters.

German Offenlegungsschrift No. 3,404,593 also discloses a rubber spring device in which the damping force can be altered by reason of the fact that a restriction, the size of which can be altered in a small number of steps by intervention from outside, is installed in a short through flow channel between the two fluid chambers. In this arrangement, all that occurs is a more or less pronounced restriction of the quantity of fluid flowing from one chamber to the other. This results, in addition to an alteration of the damping characteristics, in an unfavorable influence on the resiliency properties of the rubber spring device. In particular, high damping forces are not achievable in the case of varying vibration frequencies.

By having two longitudinal portions of the channel arranged one above the other, a length corresponding approximately to the circumference of the dividing wall is possible. Here an alteration of the channel volume and of the size of the channel wall area can be achieved by an alteration of the channel cross-section over at least a considerable length. This alteration of the cross-section can be achieved in a simple manner by means of a diaphragm wall of the channel being enlarged or reduced in response to the application of a pressure or vacuum source to an outer side of the diaphragm.

Other objects, advantages and novel features of the present invention will become apparent from the following detailed description of the invention when considered in conjunction with the accompanying drawings.

DETAILED DESCRIPTION OF THE DRAWINGS

Figure 1:
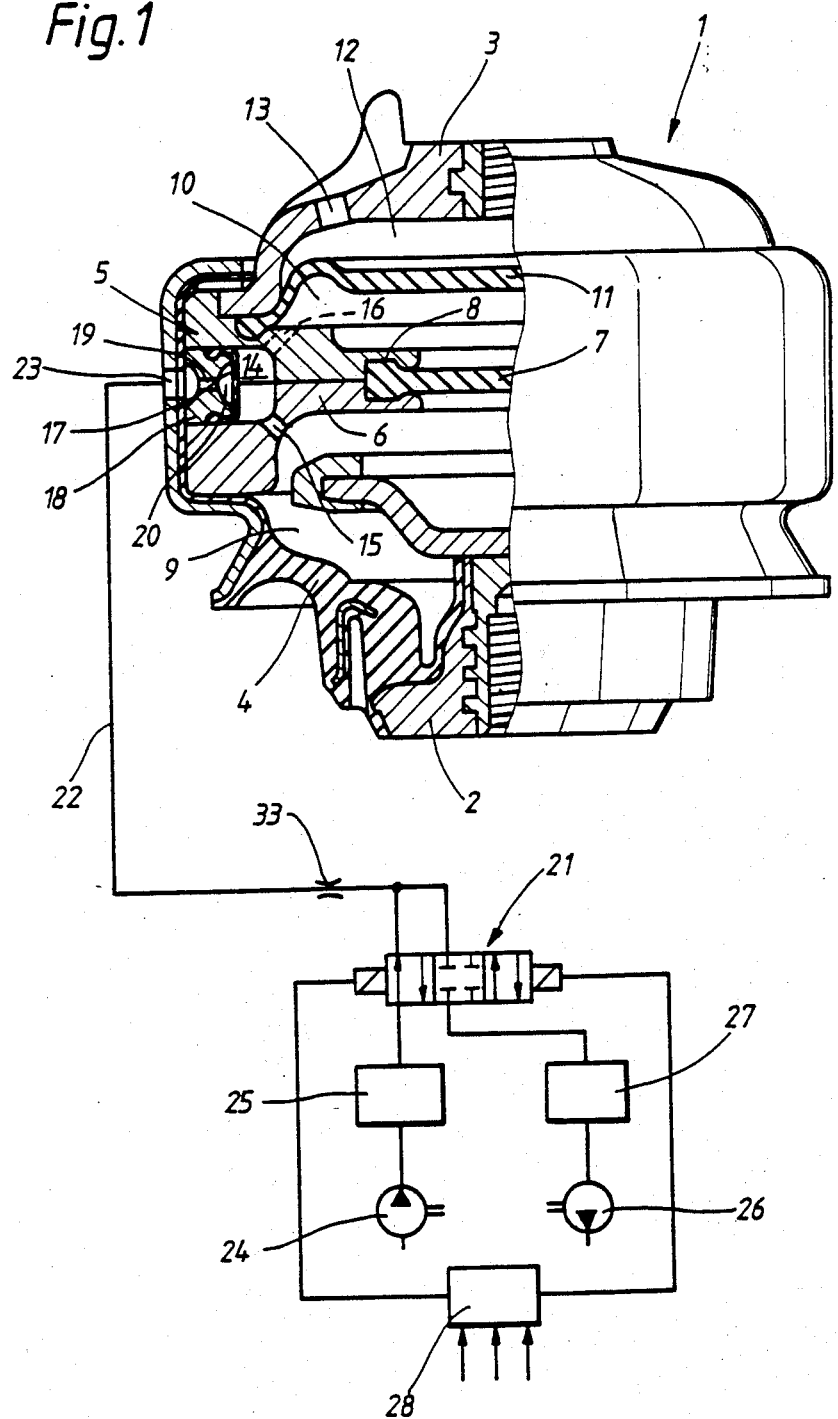
FIG. 1 shows a rubber spring device having a channel which connects two working chambers and wherein the cross-section of the channel can be altered.
Figure 2:
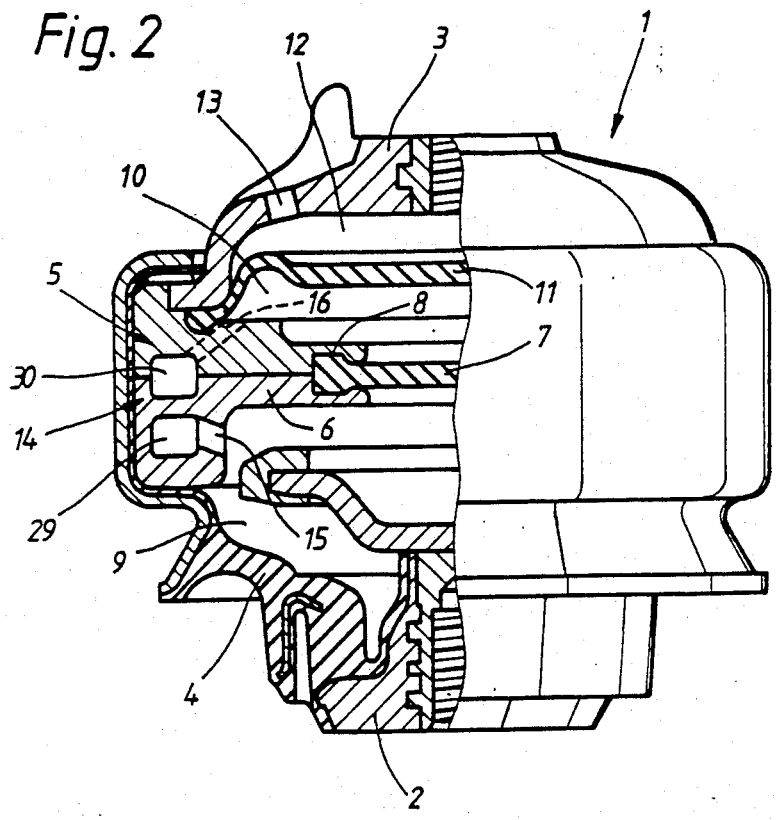
FIG. 2 shows a rubber bearing having a channel which connects two working chambers wherein the effective length of the channel can be altered.

FIGS. 1 and 2 show a rubber spring device 1 having end walls 2, 3 each of which is connected to two components which vibrate with respect to one another, such as an engine and a motor vehicle be driven by the engine. An essentially annular elastic spring element 4 is connected fluid-tightly at its bottom to the end wall 2 in such a manner as to permit force transmission. The spring element 4 is connected at its radially outer region to an annular wall 5. The annular wall in turn is connected at its top to the end wall 3. The space enclosed by the two end walls 2, 3, the spring element 4 and the annular wall 5 is subdivided by an inner collar 6 adjacent the annular wall 5 and by a dividing disc 7 which is mounted with play in an inner circumferential groove 8 in the collar 6. The enclosed space thus comprises two working chambers 9 and 10, situated above and below collar 6 and dividing disc 7. The upper working chamber 10 is divided by a bellows 11, clamped between the upper end wall 3 and the annular wall 5, to form a compensating space 12 which adjoins the upper end wall 3 and is connected to the surrounding air via an opening 13 in the latter. The two working chamber 9, 10 are filled with damping fluid and inter-communicating via the play between the dividing disc 7 and the groove 8 and via a channel 14 in the annular wall 5.

The channel 14 extends longitudinally over almost the entire circumference of the annular wall 5. An opening 15 at one of its longitudinal ends leads into working chamber 9 and an opening 16 at its other longitudinal end leads into working chamber 10. The radially outer wall of the channel 14 is formed by a diaphragm 17 which is clamped onto an externally adjoining annular body 18. Hydraulic fluid can be fed to the rear side (left in the FIG. 1 showing) of the diaphragm 17 through bores 19 in the annular body 18, to cause the diaphragm 17 to curve inwards into the channel 14, as a result of which, both the channel 14 cross-section decreases and the size of the channel wall area is altered. On the side of the annular body 18 facing the diaphragm 17, there is a recess 20 which runs almost all the way around the bearing 1 and into which the diaphragm 17 is pulled when suction is applied through opening 23 as will be explained later. As a result of suction being applied both the channel cross-section and the size of the channel wall area increase. In the region of the two openings 15 and 16, the recess 20 disappears in order to avoid a short circuit between the two openings 15, 16 when a suction is applied.

The pressure conditions in the recess 20 and hence the position of the diaphragm 17 can be controlled via a multiway valve 21 which communicates with the recess 20 via a line 22. The line 22 has a restrictor 33 arranged with an opening 23 in the annular wall 5. The line 22 can be acted upon by a pressure pump 24 via a pressurized vessel 25, or by a suction pump 26 via a depressurized vessel 27. The multiway valve 21 is electrically adjusted as a function of signals processed in a control unit 28. These signals represent: the vibration behavior of the engine or of the chassis; or particular operating conditions of the engine, such as the starting or switching-off procedure; or the nature of the surface to be driven on by the vehicle as a measure of the subsequent vibration behavior of the chassis.

By changing of the channel cross-section over a relatively great length, the channel volume and hence the volume of the fluid vibrating in the channel is simultaneously altered, as a result of which, the natural frequency of this quantity of fluid changes. It is thereby possible to match this natural frequency to the frequency of the vibrations imposed on the rubber spring device 1 from outside of the spring device, such that the fluid in the channel vibrates in resonance and hence produces an optimum damping effect. Subjecting the diaphragm 17 to pressure or suction, influences the damping force in such a way that, by virtue of the change in volume of the channel, the internal friction herein is also altered and, by virtue of the change of the size of the channel wall area, the friction between the latter and the fluid is altered.

Figure 3:
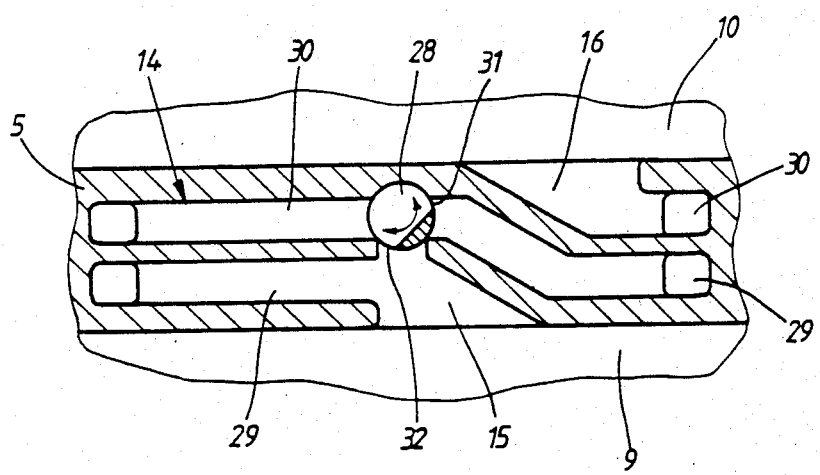
FIG. 3 shows a detail of the channel of rubber bearing illustrated in FIG. 2.

In the rubber bearing 1 of FIGS. 2 and 3, the channel 14 is arranged approximately helically in the annular wall 5 and has almost two turns. A rotary slide 28 (see FIG. 3) divides the channel 14 into a lower longitudinal portion 29 and an upper longitudinal portion 30 and is arranged approximately in the center of the channel total longitudinal extent. In one end position of the rotary slide 28, the two longitudinal portions 29 and 30 of the channel 14 are connected to one another so that the damping fluid situated in them vibrates as a unitary column, a particular natural frequency of this quantity of fluid thereby being produced. In the other end position of the rotary slide 28, the upper longitudinal portion 30 of the channel 14 is connected directly to the opening 15 leading to the lower working chamber 9 with the lower longitudinal portion 29 of the channel 14 being shut off. A higher natural frequency is thereby produced as a consequence of the smaller quantity of fluid. The effective cross-sections 31, 32 of the rotary slide 28, via which the upper longitudinal portion 30 of the channel 14 communicates with the lower longitudinal portion 29, on one hand, and with the opening 15 on the other hand, are varied continuously as the rotary slide 28 is rotated. As a result, the lower longitudinal portion 29 is connected progressively to the upper longitudinal portion 30 or separated from the latter, so that, as a consequence of the changing quantity of vibrating fluid, the natural frequency of the fluid in the channel changes between the two above-mentioned extreme values. This makes it possible, in a manner similar to that described in connection with FIG. 1, to match the damping characteristics of the rubber spring device to the vibrations which occur simply by rotating the rotary slide 28. Hence this makes possible an efficient damping of the different vibrations without having a negative effect on the resiliency properties of the rubber spring device.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A hydraulically damping rubber spring device usable as an engine mount for motor vehicles, comprising:

two end walls lying opposite one another in an axial direction of the spring device and between which are arranged two working chambers;

both working chambers are fillable with damping fluid and are separated from one another by a dividing wall in which is arranged a channel;

said channel connecting the two working chambers to one another;

the length of said channel being at least equal to the length of the dividing wall and the cross-section of the channel being small relative to its length;

a rubber-elastic spring element adjoining one of the two working chambers and secured on one end wall;

means for varying the size of a wall area and a volume of the channel by complete or partial isolation of a longitudinal portion of the channel from outside the spring device;

said means for varying including a rotary slide arranged in the channel and transverse to it;

rotation means to rotate the rotary slide so that a first longitudinal portion of the channel, which is open towards the second of said working chambers is, in one end position of the rotary slide, connected to another longitudinal portion of the channel, which is open towards the one working chamber;

and wherein in the other end position of the rotary slide, the first longitudinal portion of the channel is connected directly to the one working chamber, by-passing the other longitudinal portion of the channel;

and wherein between these two end positions of the rotary slide, the first longitudinal portion of the channel is connected to both the one working chamber and the other longitudinal portion of the channel with continuously varying rotary slide passage cross-sections.

2. A rubber spring device according to claim 1, wherein the two longitudinal portions of the channel are arranged one above the other in the axial direction of the rubber bearing, and wherein each portion has a length corresponding approximately to the perimeter of the dividing wall.

3. A rubber spring device according to claim 1 wherein a wall of the channel is flexible and wherein moving means are provided to cause the flexible wall to move to either embrace or constrict the channel.

4. A rubber spring device according to claim 2 wherein a wall of the channel is flexible and wherein moving means are provided to cause the flexible wall to move to either enlarge or constrict the channel.

* * * * *